Nov. 23, 1965

A. M. HAND 3,219,218

FREIGHT TRANSPORTATION SYSTEMS PROVIDED WITH
SIDE-TRANSFER FACILITIES

Filed Sept. 30, 1964

INVENTOR
ALBERT M. HAND
BY
Prangley, Baird, Clayton,
Miller and Vogel,
ATTYS.

Nov. 23, 1965    A. M. HAND    3,219,218
FREIGHT TRANSPORTATION SYSTEMS PROVIDED WITH
SIDE-TRANSFER FACILITIES
Filed Sept. 30, 1964    9 Sheets-Sheet 3

Nov. 23, 1965 A. M. HAND 3,219,218
FREIGHT TRANSPORTATION SYSTEMS PROVIDED WITH
SIDE-TRANSFER FACILITIES
Filed Sept. 30, 1964 9 Sheets-Sheet 4

INVENTOR
ALBERT M. HAND
BY
ATTYS.

INVENTOR
ALBERT M. HAND
BY
ATTYS.

Nov. 23, 1965    A. M. HAND    3,219,218
FREIGHT TRANSPORTATION SYSTEMS PROVIDED WITH
SIDE-TRANSFER FACILITIES
Filed Sept. 30, 1964    9 Sheets-Sheet 8

INVENTOR
ALBERT M. HAND
BY
Brazley Baird Clayton,
Miller & Vogel
ATTYS.

United States Patent Office 3,219,218
Patented Nov. 23, 1965

1

3,219,218
FREIGHT TRANSPORTATION SYSTEMS PROVIDED WITH SIDE-TRANSFER FACILITIES
Albert M. Hand, Etobicoke, Ontario, Canada, assignor to General American Transporation Corporation, Chicago, Ill., a corporation of New York
Filed Sept. 30, 1964, Ser. No. 400,486
20 Claims. (Cl. 214—516)

The present invention relates to freight transportation systems provided with side transfer facilities, and it is a general object of the present invention to provide a road semi-trailer of improved construction and arrangement and including an elongated longitudinally extending chassis that is adapted to accommodate side loading and side unloading of freight containers with respect thereto.

Another object of the invention is to provide in a freight transportation system of the character noted, a road semi-trailer comprising an elongated longitudinally extending chassis that is adapted to carry either a single long freight container or two short freight containers in tandem relation, and that comprises improved side transfer facility for effecting selective side loading and side unloading of the freight containers, as required.

A further object of the invention is to provide in a freight transportation system, a road semi-trailer of the character described that comprises a front bolster and a rear bolster and a middle bolster, wherein the middle bolster is selectively operative between an active position and a storage position, whereby the middle bolster in its active position accommodates the carrying of the two short freight containers upon the chassis, and whereby the middle bolster in its storage position accommodates the carrying of the single long freight container upon the chassis.

A still further object of the invention is to provide a road semi-trailer of the character described that comprises a pair of laterally spaced-apart front motors disposed longitudinally between the front bolster and the middle bolster, and a pair of laterally spaced-apart rear motors disposed longitudinally between the rear bolster and the middle bolster, wherein each of the four motors named is of the cylinder-piston type that may be hydraulically actuated between respective expanded and contracted positions, thereby to accommodate the side loading and the side unloading of the freight containers as aforesaid.

A still further object of the invention is to provide in a road semi-trailer of the character described, an improved arrangement for selectively operating in a simple manner the middle bolster between its active and storage positions.

Yet another object of the invention is to provide in a road semi-trailer of the character described, an improved arrangement for mounting each one of the motors named for selective movement between active and storage positions.

A still further object of the invention is to provide in a road semi-trailer of the character described, an improved arrangement of locking devices carried by the opposite ends of the bolsters, wherein the front bolster carries one pair of the locking devices mentioned, wherein the rear bolster carried another pair of the locking devices mentioned, and wherein the middle bolster carries two additional pairs of the locking devices mentioned.

Further features of the invention pertain to the particular construction and arrangement of the elements of the freight transportation system, and particularly of the elements of the road semi-trailer, whereby the above-outlined and additional operating features thereof are attained.

2

The invention, both as to its organization and method of operation, together with further objects and advantages thereof, will best be understood by reference to the following specification, taken in connection with the accompanying drawings, in which.

Referring now to FIGS. 1 to 6, inclusive, of the drawings, the freight transfer system there illustrated, and embodying the features of the present invention, essentially comprises a road tractor 50, a road semi-trailer 60, two short freight containers 70, a long freight container 80, and an associated railway flatcar 90. The tractor 50 is of conventional construction, including a chassis 51 carrying at the rear end thereof a fifth-wheel mechanism 52 capable of vertical adjustment or elevation in the usual manner; which mechanism 52 is adapted selectively to clutch and to unclutch a cooperating kingpin also in the usual manner. The railway flatcar 90 is also of conventional construction, including the usual underframe 91 carrying a flat deck 92, the underframe 91 being supported adjacent to the opposite ends thereof by wheeled trucks, indicated at 93.

Figure 4:
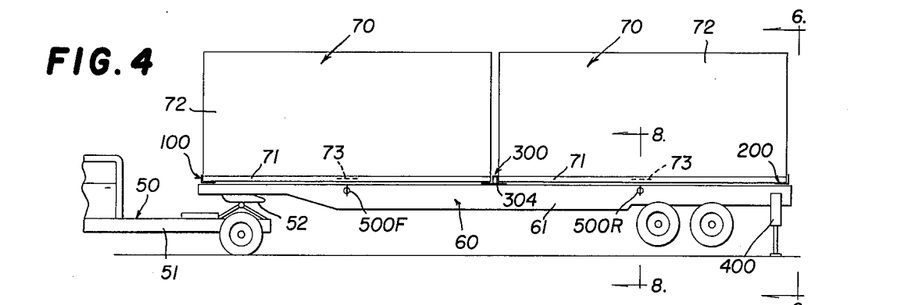
FIG. 4 is a reduced side elevational view of the semi-trailer of FIG. 3, illustrating the short freight containers loaded thereupon.
Figure 5:
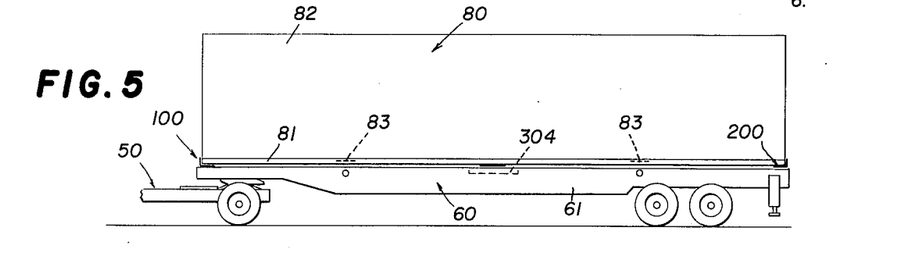
FIG. 5 is a reduced side elevational view of the semi-trailer of FIG. 3, illustrating a single long freight container loaded thereupon.

The semi-trailer 60 comprises an elongated longitudinally extending chassis 61 that is substantially rectangular in plan and of open skeleton-like construction, the chassis 60 being adapted to carry the two short freight containers 70, as indicated in FIG. 4, or the single long freight container 80, as indicated in FIG. 5. Thus, the chassis 61 has a length of about 4L, each short container 70 has a length of about 2L, and the long container 80 has a length of about 4L; wherein L is equal to about ten feet; and wherein the unit L is selected for a purpose more fully explained hereinafter. Of course, the unit L may have any fixed dimension, but ten feet is very appropriate, since most containers now in use have lengths that are multiples of ten feet, twenty-feet and forty-feet containers being quite common. The front central portion of the chassis 61 carries a depending kingpin, indicated at 62 in FIG. 1, that may be selectively clutched and declutched by the fifth-wheel mechanism 52 in the usual manner; and the rear end of the chassis 61 is supported by a pair of laterally extending and longitudinally spaced-apart axles 63 carrying at the opposite outer ends thereof road wheels 64 in the usual manner.

The two short freight containers 70 are identical; and each thereof comprises an elongated longitudinally extending substantially rectangular base 71 carrying an upstanding hollow body or housing 72 provided with door structure, not shown, and defining a lading chamber, in the usual manner. Likewise, the long freight container 80 comprises an elongated longitudinally extending substantially rectangular base 81 carrying an upstanding hollow body or housing 82 provided with door structure, not shown, and defining a lading chamber in the usual manner.

Figure 1:
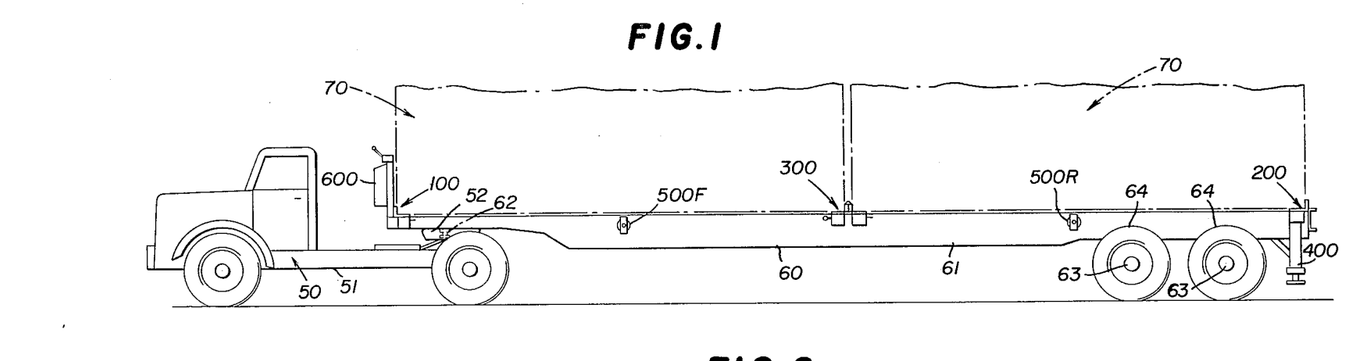
FIGURE 1 is a side elevational view of a road semi-trailer embodying the present invention.
Figure 2:
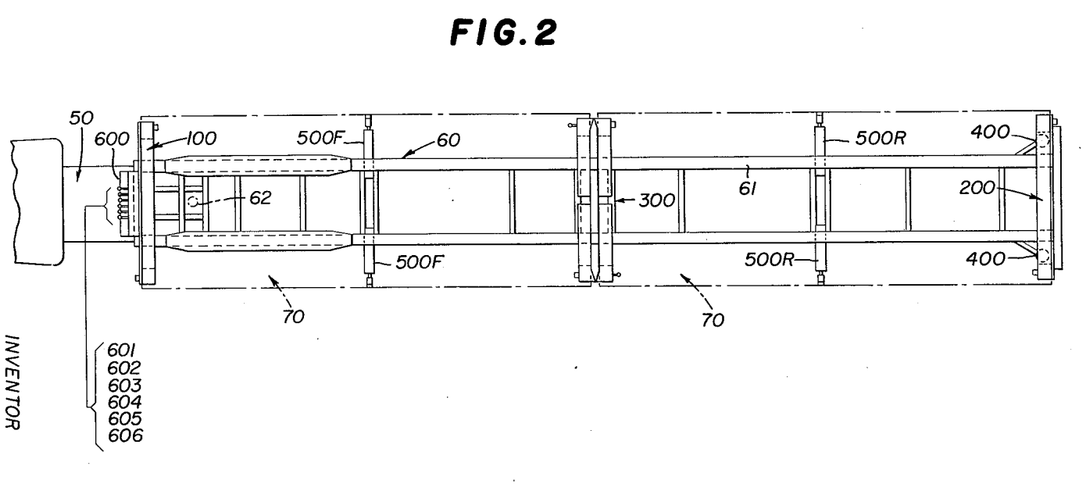
FIG. 2 is a plan view of the semi-trailer, as shown in FIG. 1.
Figure 3:
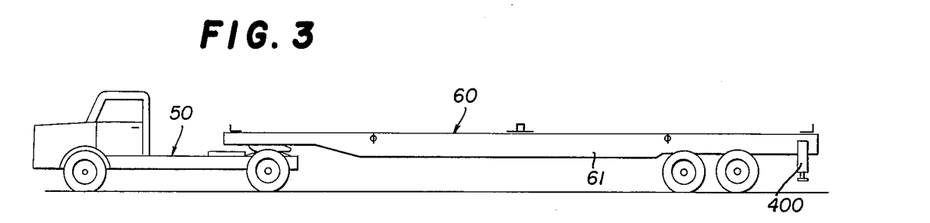
FIG. 3 is a reduced side elevational view of the semi-trailer, similar to FIG. 1.
Figure 6:
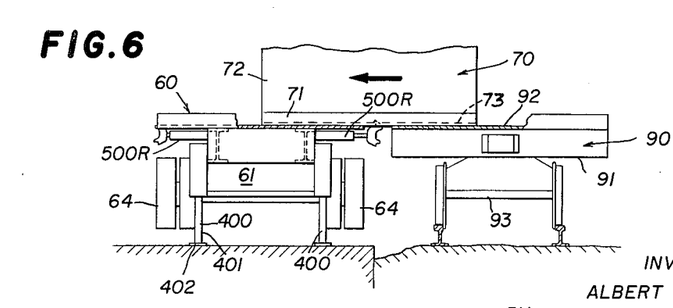
FIG. 6 is an enlarged fragmentary end view of the semi-trailer taken in the direction of the arrows along the line 6—6 in FIG. 4, and illustrating the side transfer of one of the short containers onto the semi-trailer from an associated railway flatcar.

Referring now more particularly to FIGS. 1 and 2, the semi-trailer 60 further comprises a laterally extending front bolster 100 rigidly secured to the front end of the chassis 61, a laterally extending rear bolster 200 rigidly secured to the rear end of the chassis 61, and a middle bolster 300 detachably secured to the middle or intermediate portion of the chassis 61. Also, a pair of laterall spaced-apart elevator motors 400 are carried by the extreme rear end of the chassis 61 respectively adjacent to opposite sides thereof and below the rear bolster 200. Each of the motors 400 is of the piston-cylinder type and is selectively operated to effect expansion and contraction of the associated piston rod 401, so as to effect corresponding downward and upward movements of a foot 402 carried on the extreme lower end of the piston rod 401, as indicated in FIG. 6. (Also, see FIGS. 16 and 17.) The motor 400 is entirely conventional and is of the hydraulic operated type. Thus, the two motors or elevators 400 may be thrust downwardly, as shown in FIG. 4, together with elevation of the fifth-wheel mechanism 52, to effect lifting of the chassis 61 may be employed to level the same from side to side or to effect elevation thereof to the plane of the deck 92 of the railway flatcar 70, as indicated in FIG. 6.

Still referring to FIGS. 1 and 2, the front portion of the chassis 61 carries a pair of front motors 500F disposed in laterally spaced-apart relation and arranged intermediate the front bolster 100 and the middle bolster 300 and spaced longitudinally about the distance L (ten feet) from each of the bolsters 100 and 300. Also, the rear portion of the chassis 61 carries a pair of rear motors 500R disposed in laterally spaced-apart relation and arranged intermediate the rear bolster 200 and the middle bolster 300 and spaced longitudinally about the distance L (ten feet) from each of the bolsters 200 and 300. Each of the motors 500F and 500R is of piston-cylinder type and includes a piston rod 501 that may be selectively reciprocated between expanded and contracted positions with respect to the associated cylinder 502. The motors 500F and 500R are of the hydraulic operated type and are of substantially conventional construction.

Figures 8, 9:
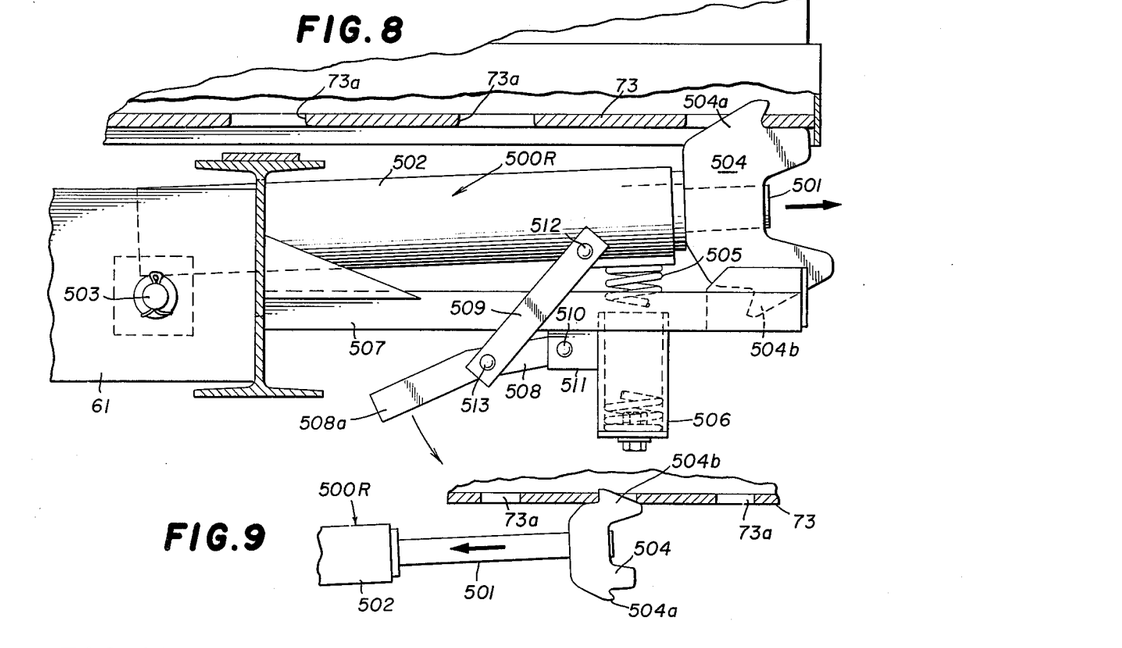
FIG. 8 is an enlarged fragmentary lateral sectional view of the semi-trailer and the short container, this view being taken in the direction of the arrows along the line 8—8 in FIG. 4; and illustrating the position of the adjacent motor for transferring the container from the semi-trailer.
FIG. 9 is a reduced fragmentary lateral sectional view of the parts shown in FIG. 8, and illustrating the position of the adjacent motor for transferring the container into the semi-trailer.

The arrangement of the motors 500F and 500R will best be understood by reference to FIG. 8, wherein the mounting of one of the motors 500R is illustrated in some detail. More particularly, the rear end of the cylinder 501 of the motor 500R is pivotally mounted upon the adjacent side of the chassis 61 by an arrangement including a pivot pin 503; whereby the motor 500R projects laterally from the side (the right-hand side, as illustrated) of the chassis 61 and outwardly therebeyond; and whereby the centerline of the piston rod 501 is disposed substantially normal to the longitudinal centerline of the chassis 61. The extreme outer end of the piston rod 501 carries a pawl 504 that is employed in side loading and in side unloading of the containers 70 and 80 with respect to the chassis 61, as explained more fully hereinafter. When the piston rod 501 is contracted, the pawl 504 is disposed near the adjacent right-hand side of the chassis 61; and when the piston rod 501 is expanded, the pawl 504 is disposed laterally well outwardly from the adjacent right-hand side of the chassis 61. The cylinder 502 has an upper or operative position, as shown in FIG. 8, and a lower or storage position, not shown. The cylinder 502 is biased into its upper position, as shown in FIG. 8, by an arrangement including a coil spring 505 acting between the cylinder 502 and a casing 506 supported by a laterally outwardly extending cam 507 rigidly secured to the chassis 61; whereby this biasing of the cylinder 502 pivots the same upwardly about the pivot pin 503 and into its operative position.

The cylinder 502 may be moved downwardly into its storage position against the bias of the spring 505, causing corresponding pivoting of the cylinder 502 downwardly about the pivot pin 503, by an arrangement including a pair of toggle links 508 and 509. The inner end of the link 508 is pivotally connected by a pin 510 to a tab 511 carried by the arm 507; and the inner end of the link 509 is pivotally connected by a pin 512 to the cylinder 502 adjacent to the outer end thereof. The outer end of the link 509 is pivotally connected by a pin 513 to the intermediate portion of the link 508; and the extreme outer end 508a of the link 508 serves as an operating handle. It will be readily understood that by depressing the handle 508a the links 508 and 509 may be moved into a stable position, moving the cylinder 502 downwardly from its position of FIG. 8 and into its previously mentioned storage position. Subsequently, the handle 508a may be lifted to return the links 508 and 509 into their positions, as illustrated in FIG. 8; whereby the cylinder 502 is returned into its operating position and restrained therein by the spring 505.

Again referring to FIGS. 1 and 2, the extreme front end of the chassis 61 carries an upstanding control console 600 that is operatively connected, when the semitrailer 60 is coupled to the tractor 50, to a hydraulic pumping system provided in the tractor 50 and of conventional construction and arrangement. Further, the control console 600 is operatively connected by a conduit system, not shown, to the two motors 400, to the two motors 500F and to the two motors 500R. Specifically, the control console 600 comprises six individual control devices 601 to 606, inclusive, and respectively corresponding to the six motors named; whereby each of the six motors may be individually and selectively controlled in its respective expansion and contraction actions, and in a manner well understood in this art. The six control devices 601 to 606, inclusive, are identical; whereby the control device 606 may correspond to the left rear elevator motor 400, as viewed from above the chassis 61. The control device 606 essentially comprises a manually operable lever pivotally mounted adjacent to the lower end thereof to the top of the control console 600, the control lever 606 having front and rear positions respectively corresponding to the expansion position and to the contraction position of the motor 400. Thus, the six motors 400, 500F and 500R, may be selectively and simultaneously manually controlled from the control console 600 by corresponding operation of the appropriate control levers 601 to 606, inclusive.

Figure 7:
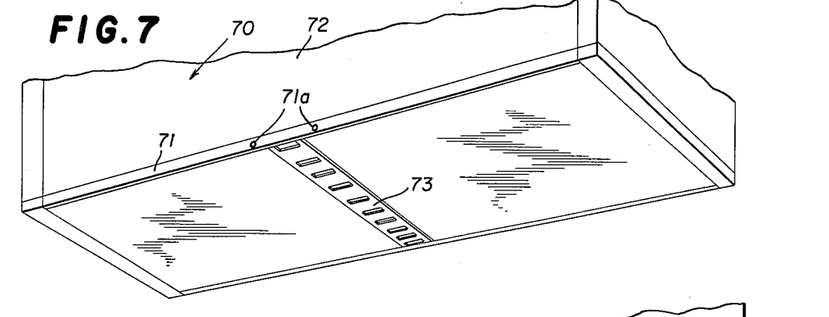
FIG. 7 is an enlarged fragmentary bottom perspecsive view of one of the short containers as shown in FIG. 4.

The short containers 70 are identical; and as best shown in FIG. 7, the base 71 of the container 70 carries a laterally extending rack 73 rigidly secured to the bottom thereof and arranged substantially in the middle of the base 71 with respect to the opposite ends thereof; whereby the rack 73 is spaced a distance of about L (ten feet) from either end of the base 71. The rack 73 is adapted to cooperate with the pawl 504 of any one of the motors 500F or 500R, as explained more fully below; and the rack 73 essentially comprises an elongated plate having a plurality of openings 73a formed therein and arranged in laterally spaced-apart relation with respect to the base 71 of the container 70, as best shown in FIGS. 8 and 9.

Also, as shown in FIGS. 8 and 9, the pawl 504 comprises two operating lugs 504a and 504b respectively disposed on the opposite sides thereof; and the piston rod 501 is mounted for rotation within the cylinder 502, so that either lug 504a or 504b may be rotated into a top or operative position with respect to a cooperating rack 73. Specifically, the lug 504a comprises a push or unloading lug, so that when the piston rod 501 is rotated to position the push lug 504a into an upper or operative position, as shown in FIG. 8, the pawl 504 is set into a pushing or unloading position. On the other hand, the lug 504b comprises a pull or loading lug, so that when the piston rod 504 is rotated to position the pull lug 504b into an upper or operative position, as shown in FIG. 9, the pawl 504 is set into a pulling or loading position.

Considering now the operation of the rear motors 500R to effect unloading of the short container 70 from the side of the chassis 61 and specifically the middle bolster 300 and the rear bolster 200, and referring to FIGS. 6, 7, 8 and 9, the pawl 504 of the one of the rear motors 500R on the adjacent side of the chassis 61 is first set or operated into its push position, as specifically shown in FIG. 8, so that the push lug 504a of the pawl 504 is disposed immediately adjacent to the rack 73 carried by the bottom of the base 71 of the container 70 in its loaded position upon the bolsters 200 and 300. Then the handle 508a of the link 508 is actuated to move the rear motor 500R from its storage position into its operative position, as shown in FIG. 8; whereby the push lug 504a falls into one of the openings 73a in the rack 73 under the bias of the spring 505. Then the corresponding control lever (assumed to be the control lever 604) is selectively operated, so as to effect reciprocation of the piston rod 501 with respect to the cylinder 502, whereby the push lug 504a cooperates with the rack 73 in order to slide the container 70 laterally with respect to the bolsters 200 and 300 and step by step from the bolsters 300 onto an adjacent outside support, such, for example, as the deck 92 of the associated railway flatcar 90, as shown in FIG. 6, thereby to cause unloading of the container 70 from the bolsters 200 and 300 and from the rear end of the chassis 61.

The mode of loading the container 70 upon the bolsters 200 and 300 from the deck 92 of the railway flatcar 90 is substantially the reverse of that described above, since in this case the pawl 504 of the proper rear motor 500R is rotated to position the pull lug 504b into its upper operative position, together with movement of the cylinder 502 from its storage position into its operative position, as shown in FIG. 9. At this time the control lever 604 may effect reciprocation of the piston rod 501, whereby the pull lug 504a of the pawl 504 cooperates with the rack 73 to effect step-by-step pulling of the container 70 in the lateral direction and the consequent side loading of the base 7 of the container 70 onto the bolsters 200 and 300.

In view of the above description, it will be understood that the rear motors 500R are operative in an identical manner; whereby the short container 70 may be loaded or unloaded with respect to either side of the rear portion of the chassis 61 and with respect to the associated bolsters 200 and 300. Also, the front motors 500F are operative, under the control of the respective control levers 605 and 606, in a manner substantially identical to that of the rear motors 500R; whereby the short container 70 may be loaded or unloaded with respect to either side of the front portion of the chassis 61 and with respect to the associated bolsters 100 and 300, in an obvious manner.

Figure 10:
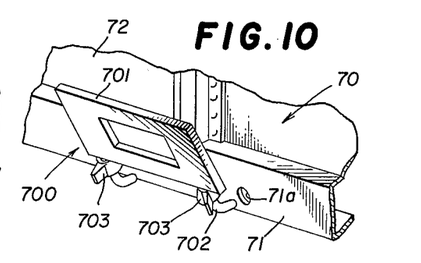
FIG. 10 is an enlarged fragmentary perspective view of demountable rack extender and the adjacent side of the short container, as shown in FIG. 7.
Figure 11:
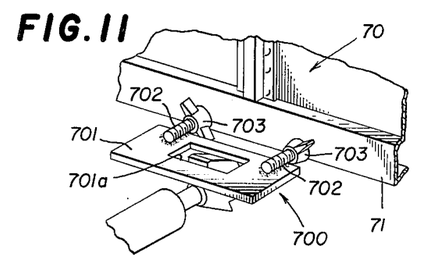
FIG. 11 is an enlarged fragmentary perspective view of the parts shown in FIG. 10, and illustrating the rack extender in its mounted position with respect to the adjacent side of the short container.
Figure 12:
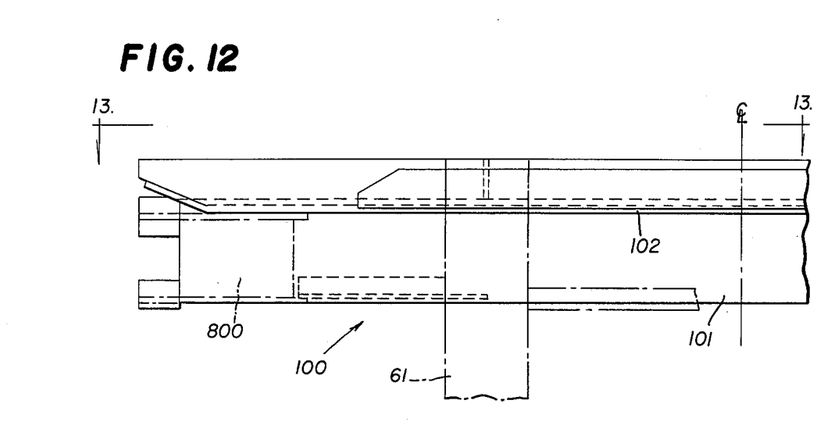
FIG. 12 is an enlarged fragmentary plan view of the left-hand end of the front bolster carried by the front end of the chassis of the road semi-trailer as shown in FIG. 2.

In the loading and unloading of the short container 70 with respect to the chassis 61 of the semitrailer 60, occasionally there is encountered the difficulty that it is impossible to place the chassis 61 of the semitrailer 60 as close laterally of the adjacent side of the deck 92 of the railway flatcar 90 as is derived and is necessary, as explained above in conjunction with FIG. 6; whereby there is provided a rack extender 700, as shown in FIGS. 11 and 12. The rack extender 700 may be detachably secured, as required, to either side of the base 71 of the container 70 and adjacent to the corresponding end of the rack 73. The rack extender 700 essentially comprises a plate 701 having an opening 701a therein that is adapted to cooperate with a pawl 504, thereby to effect extension of the adjacent end of the rack 73 in an obvious manner. The rack extender 700 is detachably secured to the adjacent side of the base 71 in any suitable manner, such, for example, as by a pair of threaded studs 702 rigidly carried by the inner side of the plate 701. The studs 702 are arranged in longitudinally spaced-apart relation and project laterally from the plate 701; and the studs 702 are adapted to be inserted into either pair of holes 71a respectively provided in the opposite sides of the base 71 and respectively adjacent to the opposite ends of the rack 73. Thus, the rack extender 700 may be detachably connected to either side of the base 71 employing the pair of the holes 71a formed in the corresponding side of the base 71 together with the studs 702. The studs 702 may be anchored in place to the base 71 in any suitable manner, when the rack extender 700 is detachably connected to the base 71; an, as illustrated in FIGS. 11 and 12, the intermediate portions of the two studs 702 respectively carry two wing nuts 703, and extreme outer ends of the studs 702 are turned upwardly. Thus, the extreme outer ends of the studs 702 may be inserted into a pair of the holes 71a, as shown in FIG. 10; and then the plate 701 may be rocked or rotated downwardly into a horizontal position, as shown in FIG. 11. At this time, the wing nuts 703 may be rotated to clamp the base 71, so as to anchor the rack extender 700 in place.

When the rack extender 700 is not required it is normally removed from its mounted position, as shown in FIG. 11; however, the rack extender 700 is ordinarily detachably secured to the outer side of the body 72 of the container 70 in any suitable manner, not shown, so that the rack extender 700 is shipped with the container 70 in order that the same is available in the event it is needed in the subsequent handling of the container 70, as described above.

Figure 13:
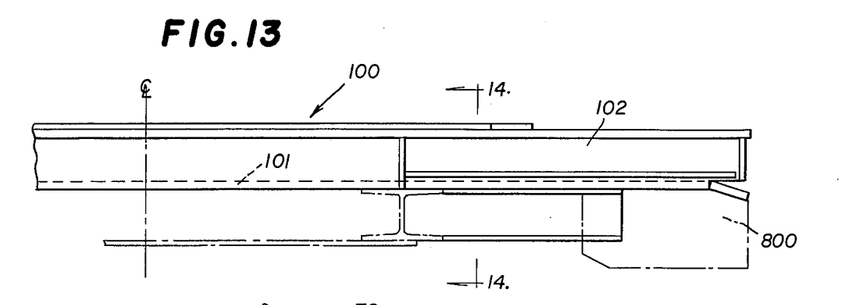
FIG. 13 is an enlarged fragmentary lateral end elevational view of the left-hand end of the front bolster, this view being taken in the direction of the arrows along the line 13—13 in FIG. 12.
Figure 14:
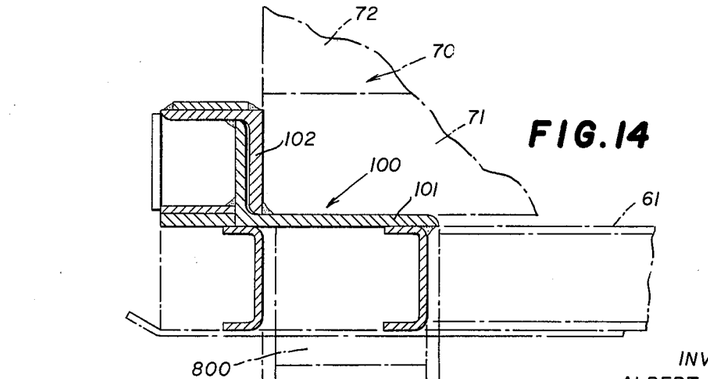
FIG. 14 is a greatly enlarged fragmentary longitudinal sectional view of the front bolster, this view being taken in the direction of the arrows along the line 14—14 in FIG. 13.

As best shown in FIGS. 12 to 14, inclusive, the front bolster 100 is rigidly secured to the front end of the chassis 61 immediately rearwardly of the control console 600 and extends laterally thereof and essentially comprises a substantially horizontal bottom supporting plate 101 carrying upstanding guard and guide structure 102 at the front edge thereof; whereby the front bolster 100 is adapted to receive and to support the front end of one of the short containers 70, as indicated in FIG. 14, or the front end of the long container 80, as indicated in FIG. 5. Further, the opposite outer ends of the front bolster 100 respectively carry a pair of locking devices, indicated at 800; which pair of locking devices 800 respectively cooperate with the opposite front corners of a mounted container 70 or 80, as explained more fully hereinafter.

Figure 15:
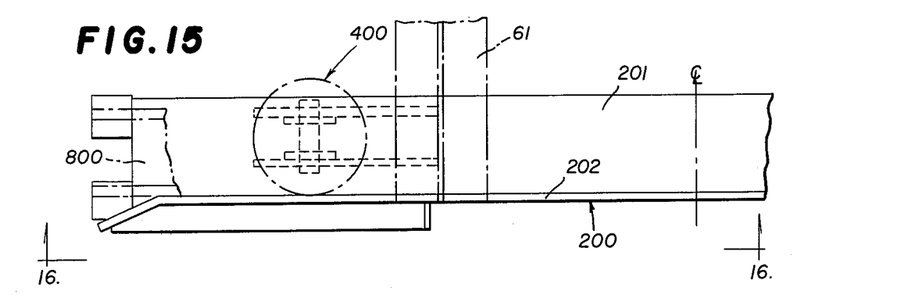
FIG. 15 is an enlarged fragmentary plan view of the left-hand end of the rear bolster carried by the rear end of the chassis of the road semi-trailer as shown in FIG. 2.
Figures 16, 17:
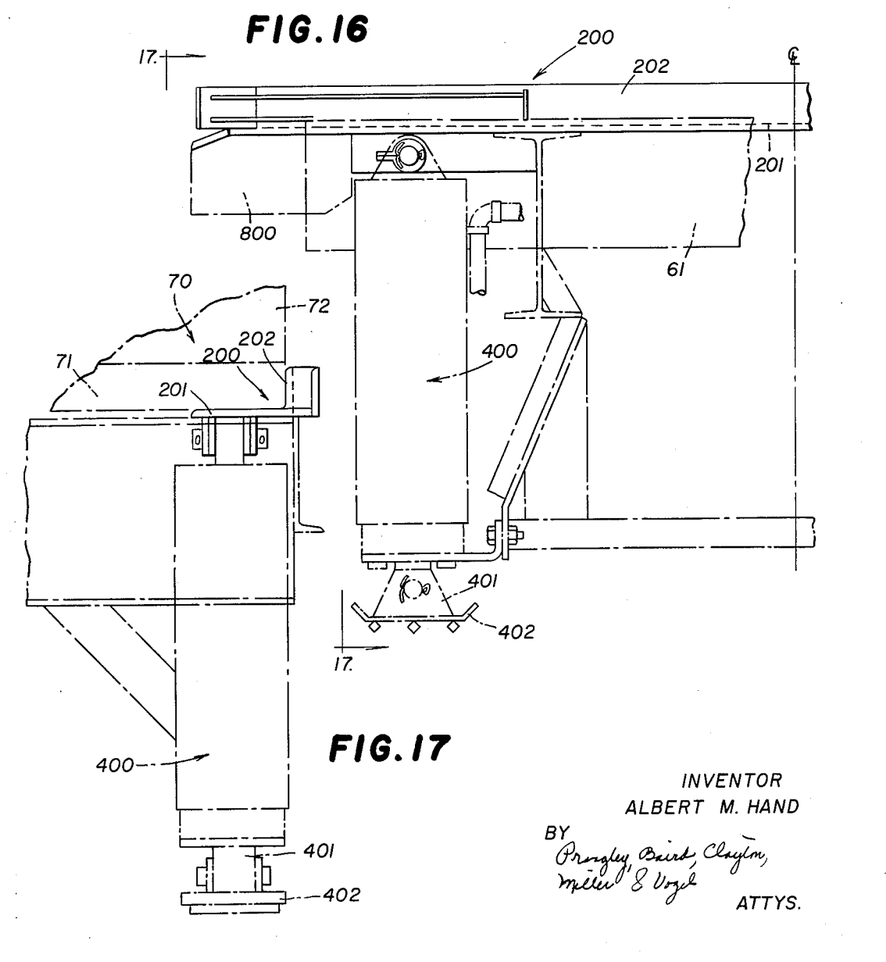
FIG. 16 is an enlarged fragmentary lateral end elevational view of the left-hand end of the rear bolster, this view of the left-hand end of the rear bolster, this view being taken in the direction of the arrows along the line 16—16 in FIG. 15.
FIG. 17 is an enlarged fragmentary longitudinal side elevational view of the rear bolster, this view being taken in the direction of the arrows 17—17 in FIG. 16.

As best shown in FIGS. 15 to 17, inclusive, the rear bolster 200 is rigidly secured to the chassis 61 immediately adjacent to the extreme rear end thereof and extends laterally of the chassis 61 and essentially comprises a substantially horizontal bottom supporting plate 201 carrying upstanding guard and guide structure 202 at the rear edge thereof; whereby the rear bolster 200 is adapted to receive and to support the rear end of one of the short containers 70, as indicated in FIG. 17, or the rear end of the long container 80, as indicated in FIG. 5. Further, the opposite outer ends of the rear bolster 200 respectively carry a pair of locking devices, indicated at 800; which pair of locking devices 800 respectively cooperate with the opposite rear corners of a mounted container 70 or 80, as explained more fully hereinafter.

Figure 18:
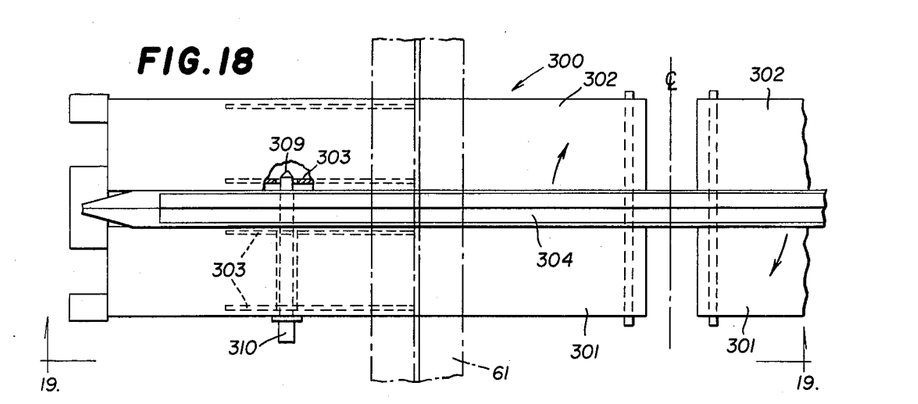
FIG. 18 is an enlarged fragmentary plan view of the left-hand end of the middle bolster carried by the middle of the chassis of the road semi-trailer, as shown in FIG. 2.
Figure 19:
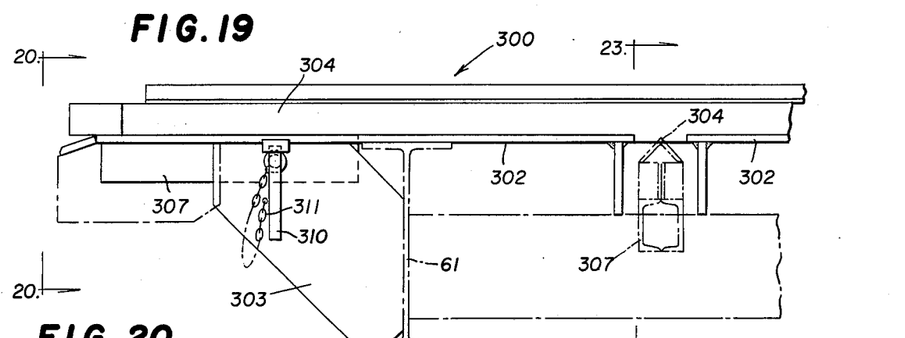
FIG. 19 is an enlarged fragmentary lateral elevational view of the left-hand end of the middle bolster, this view being taken in the direction of the arrows along the line 19—19 in FIG. 18.
Figure 20:
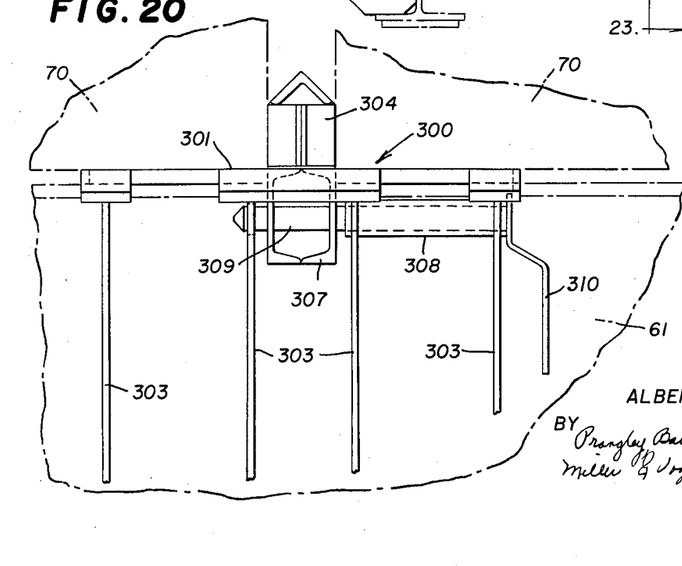
FIG. 20 is an enlarged fragmentary longitudinal elevational view of the left-hand end of the middle bolster, this view being taken in the direction of the arrows along the line 20—20 in FIG. 19.
Figure 21:
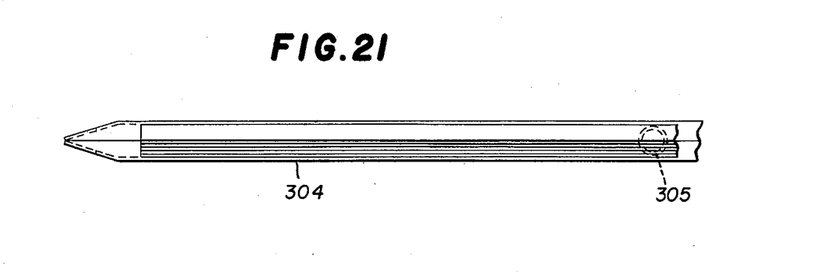
FIG. 21 is an enlarged plan view of the left-hand end of the center divider of the middle bolster, as shown in FIG. 18.
Figure 22:
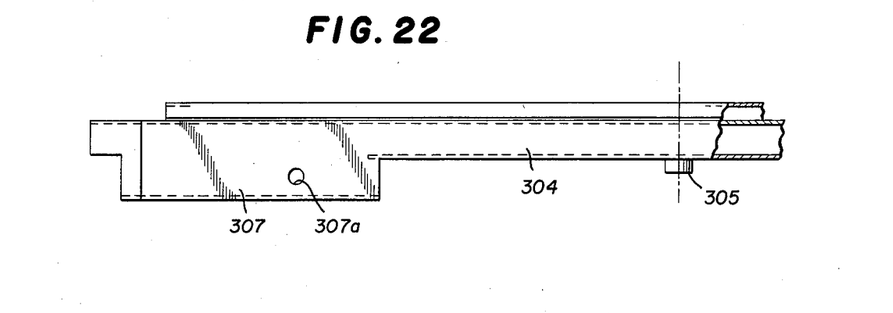
FIG. 22 is an enlarged lateral elevational view of the left-hand end of the center divider, as shown in FIG. 21.
Figure 23:
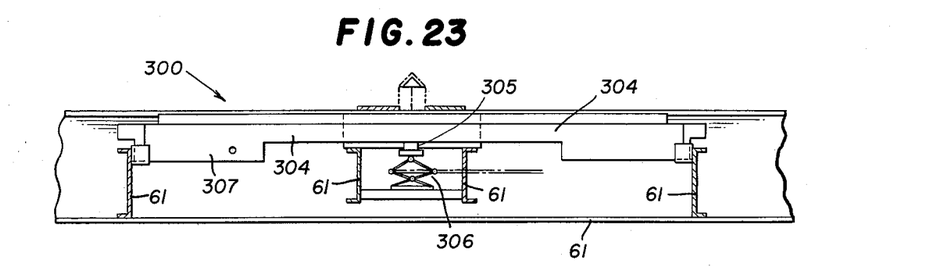
FIG. 23 is a reduced fragmentary longitudinal sectional view of the chassis of the road semi-trailer when the center divider of FIGS. 21 and 22 occupies its storage position within the chassis, the view being taken in the direction of the arrows along the line 23—23 in FIG. 19.
Figure 24:
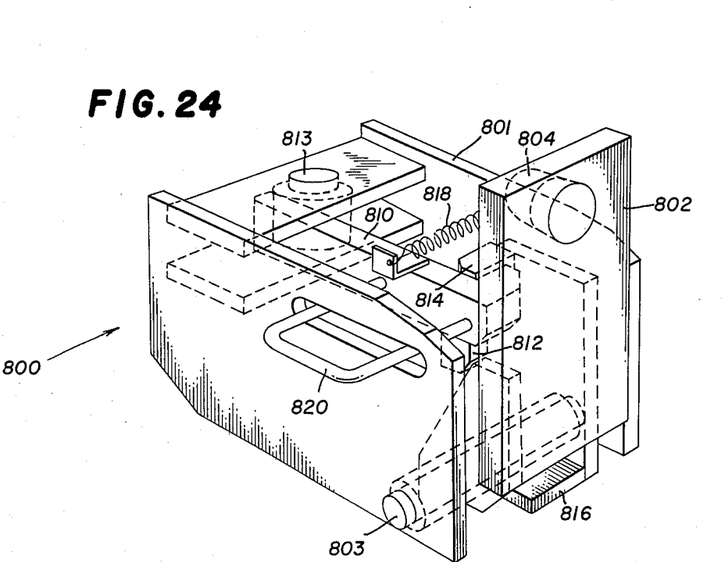
FIG. 24 is an enlarged front perspective view of one of the locking devices that is incorporated in each of the front bolster and the rear bolster and the middle bolster, as indicated in FIG. 1.
Figure 25:
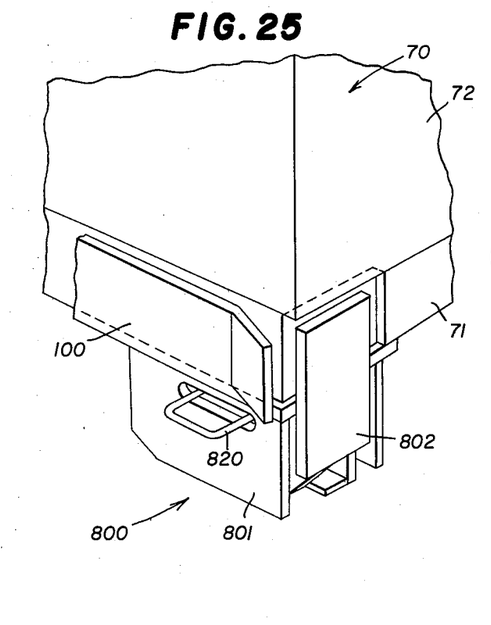
FIG. 25 is an enlarged fragmentary front perspective view of the locking device of FIG. 24, as incorporated in the front boltser of FIG. 1, together with the adjacent cooperating corner of the base of the short freight container, also as shown in FIG. 1.
Figure 26:
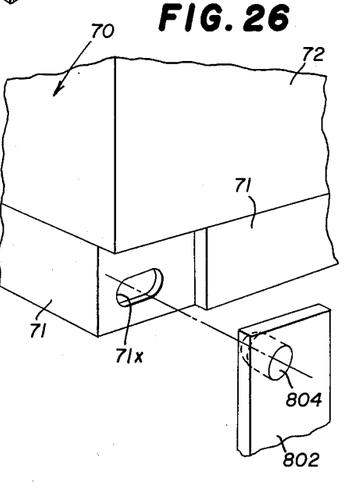
FIG. 26 is an enlarged fragmentary exploded perspective view of certain of the parts of FIG. 25, and illustrating the manner in which the bolt of the locking device lock in place the cooperating carrier of the base of the container.

As best shown in FIGS. 18 to 23, inclusive, the middle bolster 300 is detachably secured to the middle or intermediate portion of the chassis 61 of the semi-trailer 60 and essentially comprises a composite base including a pair of laterally spaced-apart base sections 301. More particularly, each of the base sections 301 essentially comprises a substantially horizontally disposed supporting plate 302 that is detachably connected to the adjacent side of the chassis 61 by an arrangement including a series of plates 303 rigidly secured to the adjacent side of the chassis 61 and extending laterally outwardly therefrom, the individual plates 303 being disposed in longitudinally spaced-apart relation. Also, the middle bolster 300 comprises an elongated center divider 304 that carries at the center thereof a mounting tube 305, as best shown in FIGS. 21 and 22; which mounting tube 305 is mounted upon elevator mechanism 306 carried by the central portion of the chassis 61, as best shown in FIG. 23. More particularly, the elevator mechanism 306 supports the mounting tube 305 for rotation about a substantially vertical axis extending through the elevator mechanism 306, and also the elevator mechanism accommodates movement of the center divider 304 between upper and lower positions respectively constituting storage and active positions. Specifically, the center divider 304 may be rotated into a longitudinal position and then the elevator 306 may be operated to lower the center divider 304 into its storage position, as shown in FIG. 23. On the other hand, the elevator mechanism 306 may be operated to elevate the center divider 304 well above the supporting plates 302, so that the center divider 304 may be then rotated into a laterally extending position; and then subsequently, the center divider 304 may be lowered by actuation of the elevator mechanism 306 so that the center divider 304 then occupies its active position, as illustrated in FIGS. 18, 19 and 20.

The opposite ends of the center divider 304 respectively carry a pair of enlargements 307 that project downwardly between the adjacent center pair of the plates 303 when the center divider 304 occupies its active position, as best shown in FIGS. 18, 19 and 20. The outer two of the plates 303 carry a laterally extending tube 308, as best shown in FIG. 20; into which tube 308 there is mounted a latch pin 309 that carries a manually operable handle 310 on the outer end thereof. It will be understood that the latch pin 309 may be manipulated by the associated handle 310 from the adjacent outer side of the chassis 61, so that the latch pin 309 may be selectively operated into latch and unlatch positions. Specifically, when the latch pin 309 occupies its latch position, the same is projected laterally inwardly through aligned holes 307a provided in the opposite sides of the enlargement 307 and also into an aligned hole provided in any adjacent one of the plates 303, as best shown in FIGS. 18, 19 and 20. Of course, the latch pin 309 in its latch position restrains the center divider 304 in its active position and also holds the adjacent base section 301 in its mounted position upon the adjacent side of the chassis 61. For the purpose of preventing loss of the latch pin 309, an associated chain 311 is fixedly connected at the opposite ends thereof to the handle 310 and to the adjacent outer plate 303.

In view of the foregoing, it will be understood that the middle bolster 300 may be placed and removed as desired, with respect to the middle or intermediate portion of the chassis 61, and that when the middle bolster 300 occupies its mounted position upon the chassis 61, the center divider 304 may be selectively operated between its active position extending laterally of the chassis 61, as shown in FIGS. 17, 18 and 19, and its storage position, as shown in FIG. 23, extending longitudinally of the chassis 61. When the center divider 304 occupies its active position extending laterally of the chassis 61, as shown in FIGS. 18, 19 and 20, the center bolster 304 is adapted to support the adjacent ends of two of the short containers 70, as indicated in FIG. 20. On the other hand, when the center divider 304 occupies its storage position, the same is disposed in non-interfering position with respect to the intermediate portion of a long container 80, as indicated in FIG. 5.

In view of the foregoing, it will be understood that when it is desirable to carry two short containers 70 upon the chassis 61, the middle bolster 300 is mounted upon the chassis 61 and the center divider 304 is operated into its active position extending laterally of the chassis 61; whereby the front bolster 100 and the front portion of the middle bolster 300 is adapted to support one of the short containers 70 on the front portion of the chassis 61; and whereby the rear bolster 200 and the rear portion of the middle bolster 300 is adapted to support the other of the short containers 70 on the rear portion of the chassis 61.

On the other hand, when it is desirable to carry the long container 80 upon the chassis 61, the middle bolster 300 may be demounted or removed with respect to the intermediate portion of the chassis 61; on the other hand, the middle bolster 300 may remain upon the intermediate portion of the chassis 61 and the center divider 304 thereof merely operated into its storage position, as previously explained. In this case, the opposite ends of the long container 80 are respectively supported by the front bolster 100 and the rear bolster 200, the middle bolster 300 being either removed from the chassis 61 or mounted thereupon with the center divider 304 in its storage position. In any case, when the long container 80 is to be carried by the chassis 61, the middle bolster 300 is operated, as explained above, so as not to cause interference to the support of the long container 80 upon the front bolster 100 and the rear bolster 200, as shown in FIG. 5.

In view of the foregoing, it will be understood that the side loading and the side unloading of the long container 80 with respect to the chassis 61 is substantially identical to that previously described in conjunction with the side loading and the side unloading of the short container 70. More particularly, the bottom of the long container 80 carries two laterally extending and longitudinally spaced-apart racks 83, as indicated in FIG. 5; which racks 83 may be identical to the racks 73 that are carried by the two short containers 70, as previously described. In this case, it is mentioned that each of the racks 83 is located longitudinally inwardly from the adjacent end of the container 80 substantially by the distance L (ten feet); whereby the two racks 83 are adapted to cooperate with the two motors 500F and 500R disposed on either side of the chassis 61, as previously explained. Accordingly, in the side loading and in the side unloading of the long container 80 with respect to either side of the chassis 61, the adjacent pair of motors 500F and 500R may be simultaneously manipulated, so as to effect the required pushing or the required pulling of the corresponding two racks 83, thereby to effect the desired side loading or side unloading of the long container 80 in an obvious manner.

As previously noted, the opposite ends of the several bolsters 100, 200 and 300 carry the pairs of locking devices 800; whereby it will be appreciated that when the long container 80 or two of the short containers 70 are mounted upon the appropriate bolsters, as previously explained, the required ones of the locking devices 800 are operated into their locked position with respect to the adjacent four corners of the mounted container, so as to restrain the same in place during travel of the road semi-trailer 60.

Figure 27:
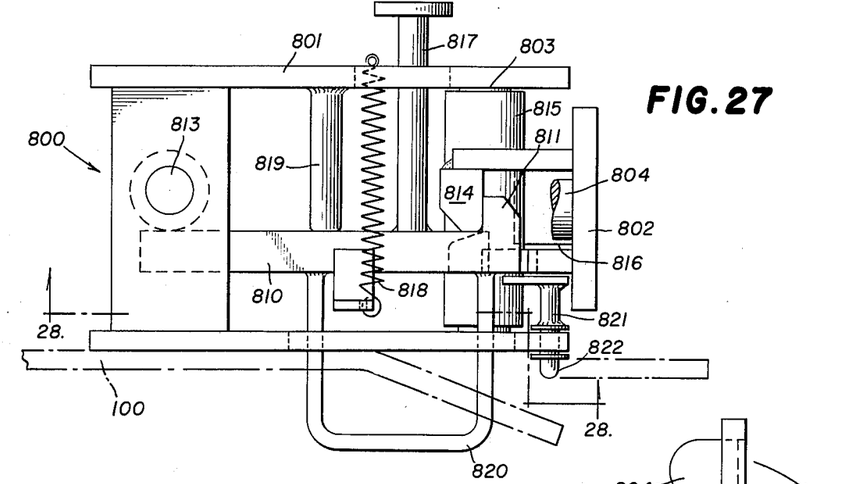
FIG. 27 is an enlarged plan view of the loading device of FIG. 24.
Figure 28:
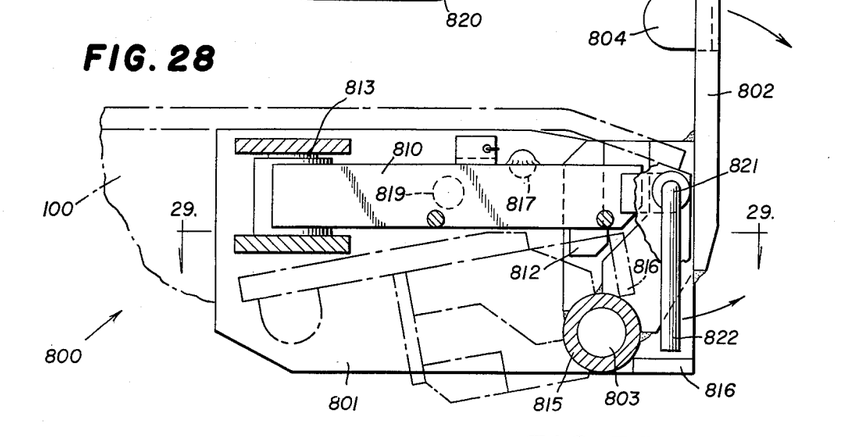
FIG. 28 is an enlarged lateral sectional view of the locking device, this view being taken in the direction of the arrows along the line 28—28 in FIG. 27.

The construction and arrangement of the individual locking devices 800 will best be understood by reference to FIGS. 24 to 30, inclusive; whereby the locking device 800 illustrated essentially comprises a support 801 of box-like form carrying a bolt 802 pivotally mounted thereupon by a longitudinally extending pivot pin 803; whereby the bolt 802 is mounted for pivotal movements into a lock position, as shown in full lines in FIG. 28, into a release position, not shown, and into a storage position, as shown in dotted lines in FIG. 28. The bolt 802 in its lock position of FIGS. 24, 25, 26, 27 and 28 occupies an upstanding attitude and high position; the bolt 802 in its release position occupies a depending attitude and low position; and the bolt 802 in its storage position occupies an under-swung attitude and intermediate position and disposed entirely below the adjacent outer end of the front bolster 100 illustrated. As clearly shown in FIGS. 24, 25 and 26, the outer end of the bolt 802 carries a locking detent 804 on the inner side thereof that cooperates with a hole 71x formed in the adjacent corner of the base 71 of the short container 70. Specifically, in its lock position, the bolt 802 projects the locking detent 804 into the cooperating hole 71x mentioned, thereby to lock in place the adjacent corner of the base 71 of the container 70. When the bolt 802 is moved out of its lock position, the locking detent 804 is withdrawn from the cooperating hole 71x mentioned, in an obvious manner.

Also, the locking device 800 comprises a latch arm 810 carrying a first detent 811 for selectively restraining the bolt 802 in its lock position and a second detent 812 for selectively restraining the bolt 802 in its storage position. Specifically, the latch arm 810 is mounted for pivotal movement at the inner end thereof upon a vertically extending pin 813 carried by the box 801; the first detent 811 is carried by the outer end of the latch arm 810 and cooperates with a latch lug 814 carried by the upper portion of tubular structure 815 rigidly secured to the inner end of the bolt 802 and mounted upon the pin 803; and the second detent 812 is carried by the outer end of the latch arm 810 and cooperates with a latch lug 816 carried by the lower portion of the tubular structure 815. The pivotal movement of the latch 810 is guided by a bar 817 rigidly secured to the intermediate portion of the latch arm 810 and projecting through a cooperating slot in the box 801 to the exterior thereof, as shown in FIG. 27; and also the latch arm 810 is biased by a coil spring 818 in the counterclockwise direction about the pin 813, as viewed in FIG. 27, and into engagement with a stop 819 disposed within the box 801.

Figure 29:
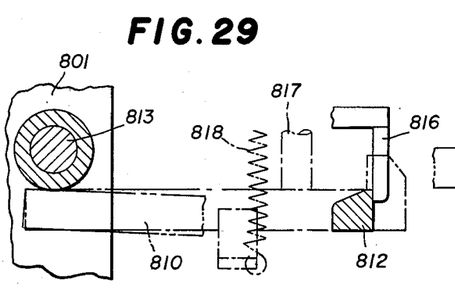
FIG. 29 is another enlarged fragmentary lateral sectional view of the locking device, this view being taken in the direction of the arrows along the line 29—29 in FIG. 28.
Figure 30:
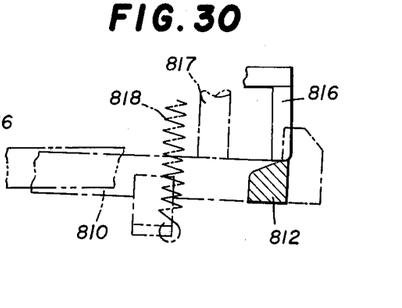
FIG. 30 is yet another enlarged fragmentary sectional view of the locking device, similar to FIG. 29, and illustrating the positions of certain of the parts immediately preceding the positions thereof, as shown in FIG. 29.

When the bolt 802 is pivoted into its lock position, as shown in FIG. 27, the latch lug 814 rides behind the detent 811, so as to latch the bolt 802 in the lock position. When the latch arm 810 is pivoted in the clockwise direction, as viewed in FIG. 27, about the pin 813 against the bias of the spring 818, the detent 811 is tripped with respect to the latch lug 814; whereby the bolt 802 is released and falls by gravity from its lock position. Specifically, the bolt 802 is rotated about the pin 803 from its lock position through its release position and into its storage position. When the bolt 802 is rotated into its storage position, the latch lug 816 rides over the detent 812, as shown in FIG. 30, and then behind the detent 812, as shown in FIG. 29; whereby the bolt 802 is thus latched into its storage position, as illustrated in broken lines in FIG. 28. Subsequently, when the latch arm 810 is pivoted in the clockwise direction, as viewed in FIG. 27, about the pin 813 against the bias of the spring 818, the detent 812 is tripped with respect to the latch lug 816; whereby the bolt 802 is released and falls by gravity from its storage position. Specifically, the bolt 802 is rotated about the pin 803 from its storage position into its release position.

The latch arm 810 may be manually operated by a bail-like handle 820 carried thereby and extending exteriorly of the box 801. Also, the latch arm 810 may be manually operated by striking the outer end of the bar 17, as is apparent from an examination of FIG. 27. Finally, the locking device 800 comprises a gravity lock 821 that normally prevents operation of the latch arm 810 into its trip position; which gravity lock 821 carries a depending handle 822 that may be rotated upwardly against the action of gravity to cause the gravity lock 821 to release the latch arm 810, so that it may be operated or tripped, as explained above.

In view of the foregoing, it is apparent that there has been provided an improved freight transportation system comprising an improved road semi-trailer incorporating improved side transfer facility for effecting selective side loading and side unloading of freight containers with respect to the chassis of the road semi-trailer, as required.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a road vehicle including a chassis carrying on the top thereof an elongated longitudinally extending and generally rectangular and substantially horizontal platform, a freight container carrying on the bottom thereof an elongated longitudinally extending and generally rectangular base, said platform accommodating side loading and side unloading of said container with respect thereto and laterally over either longitudinally extending side edge of said platform, the top of said platform directly engaging the bottom of said base and accommodating sliding movements in either lateral direction of said base over either side edge of said platform incident to side loading and to side unloading of said container with respect to said platform, locking mechanism carried by said chassis and selectively operative between lock and unlock positions with respect to said container in its loaded position on said platform, a pair of laterally spaced-apart motors respectively mounted on the opposite sides of said chassis and immediately below said platform, each one of said motors being of the piston-cylinder type and including an elongated piston rod mounted for reciprocating movements relative to and laterally of said platform and along a line disposed substantially normal to the corresponding one adjacent side edge of said platform, a pair of pawl elements respectively carried by said piston rods respectively adjacent to the outer ends thereof, each one of said piston rods having a stroke such that upon extension thereof the corresponding one of said pawl elements is positioned well outwardly from the corresponding one adjacent side edge of said platform and such that upon contraction thereof said one pawl element is positioned closely adjacent to the one adjacent side edge of said platform, means carried by said chassis for selectively operating said motors, each one of said motors being operative to effect reciprocation of the corresponding one of said piston rods, and an elongated laterally extending rack element fixed to the bottom of said base and adapted selectively to cooperate with said pawl elements, each one of said pawl elements being selectively adjustable between loading and unloading positions of cooperation with said rack element, wherein each one of said pawl elements in its loading position clutches said rack element in response to contraction of the corresponding one of said piston rods and overrides said rack element in response to expansion of said one piston rod, with the result that reciprocation of said one piston rod effects inward step-by-step sliding movement of said base over the corresponding one adjacent side edge of said platform and the consequent side loading of said container upon said platform, and wherein each one of said pawl elements in its unloading position clutches said rack element in response to expansion of the corresponding one of said piston rods and overrides said rack element in response to contraction of said one piston rod, with the result that reciprocation of said one piston rod effects outward step-by-step sliding movement of said base over the corresponding one adjacent side edge of said platform and the consequent side unloading of said container from said platform, said piston rods being arranged in lateral alignment with each other, whereby said container may be slid in either lateral direction across said platform and between two external supports respectively positioned on opposite sides of said platform by sequential operation of said motors.

2. The combination set forth in claim 1, wherein each one of said motors is pivotally mounted upon the corresponding one adjacent side of said chassis, so that said one motor is capable of moving up and down about its pivotal mounting in order to accommodate ready overriding of the corresponding one of said pawl elements with respect to said rack element as aforesaid.

3. The combination set forth in claim 1, and further comprising a rack extender, and means for selectively detachably connecting said rack extender to either side of said base in lateral alignment with the corresponding one adjacent outer end of said rack, said rack extender in its operative position connected to one side of said base projecting laterally outwardly therefrom beyond the corresponding one adjacent outer end of said rack and adapted to cooperate with either one of said pawl elements, whereby said rack extender accommodates side loading and side unloading of said container between said platform and an external support when there is a greater than normal lateral spacing between said platform and the external support.

4. The combination set forth in claim 1, wherein each one of said pawls includes two opposed sections respectively constituting loading and unloading sections, and each one of said pawls is mounted for rotary adjustment about the axis of the corresponding one of said position, whereby said one pawl occupies its loading position when the corresponding loading section thereof is rotated into facing relation with said rack element and occupies its unloading position when the corresponding unloading section thereof is rotated into facing relation with said rack element.

5. In combination, a road vehicle including a chassis carrying on the top thereof an elongated longitudinally extending and generally rectangular and substantially horizotal platform, a freight container carrying on the bottom thereof an elongated longitudinally extending and generally rectangular base, said platform accommodating side loading and side unloading of said container with respect thereto and laterally over either longitudinally extending side edge of said platform, the top of said platform directly engaging the bottom of said base and accommodating sliding movements in either lateral direction of said base over either side edge of said platform incident to side loading and to side unloading of said container with respect to said platform, locking mechanism carried by said chassis and selectively operative between lock and unlock positions with respect to said container in its loaded position on said platform, a pair of motors, a pair of mounting mechanisms respectively mounting said motors on the opposite sides of said chassis and intermediate the ends thereof and immediately below said platform, each one of said motors being of the piston-cylinder type and including an elongated piston rod mounted for reciprocating movements relative to and laterally of said platform and along a line disposed substantially normal to the corresponding one adjacent side edge of said platform, each one of said mounting mechanisms accommodating movements of the corresponding one of said motors between an upper active position and a lower inactive position, a pair of pawl elements respectively carried by said piston rods respectively adjacent to the outer ends thereof, each one of said piston rods having a stroke such that upon extension thereof the corresponding one of said pawl elements is positioned well outwardly from the corresponding one adjacent said edge of said platform and such that upon contraction thereof said one pawl element is positioned closely adjacent to the one adjacent side edge of said platform, each one of said pawl elements being disposed substantially in the plane of said platform when the corresponding one of said motors occupies its active position and being disposed somewhat below the plane of said platform when said corresponding one motor occupies its inactive position, means carried by said chassis for selectively operating said motors, each one of said motors being operative to effect reciprocation of the corresponding one of said piston rods, and an elongated laterally extending rack element fixed to the bottom of said base and adapted selectively to cooperate with said pawl elements, each one of said pawl elements being selectively adjustable between loading and unloading positions of cooperation with said rack element, wherein each one of said pawl elements in its loading position with the corresponding one of said motors in its active position clutches said rack element in response to contraction of the corresponding one of said piston rods and overrides said rack element in response to expansion of said one piston rod, with the result that reciprocation of said one piston rod effects inward step-by-step sliding movement of said base over the corresponding one adjacent side edge of said platform and the consequent side loading of said container upon said platform, and wherein each one of said pawl elements in its unloading position with the corresponding one of said motors in its active position clutches said rack element in response to expansion of the corresponding one of said piston rods and overrides said rack element in response to contraction of said one piston rod, with the result that reciprocation of said one piston rod effects outward step-by-step sliding movement of said base over the corresponding one adjacent side edge of said platform and the consequent side unloading of said container from said platform, said piston rods being arranged in lateral alignment with each other, whereby said container may be slid in either lateral direction across said platform and between two external supports respectively positioned on opposite sides of said platform by sequential operation of said motors.

6. The combination set forth in claim 5, and further comprising a pair of springs respectively cooperating with said mounting mechanisms, each one of said springs biasing the associated one of said motors into its active position.

7. The combination set forth in claim 5, and further comprising a pair of latching mechanisms respectively cooperating with said mounting mechanisms, each one of said latching mechanisms being selectively operative to hold the associated one of said motors in its inactive position and to release said one motor for movement into its active position.

8. In combination, a road vehicle including an elongated longitudinally extending chassis, a pair of laterally extending and longitudinally spaced-apart bolsters carried on the top of said chassis, a freight container having an elongated longitudinally extending and generally rectangular base, said bolsters accommodating side loading and side unloading of said container with respect to said chassis and laterally over either pair of corresponding ends of said bolsters, the tops of said bolsters being arranged in a generally horizontal plane and directly engaging the bottom of said base respectively adjacent to the opposite ends of said base and accommodating sliding movements in either lateral direction of said base over either pair of corresponding ends of said bolsters incident to side loading and to side unloading of said container with respect to said chassis, four individual locking mechanisms respectively carried by the four ends of said bolsters, each of said locking mechanisms being selectively operative between lock and unlock positions with respect to a corresponding adjacent one of the four corners of said base when said container occupies its loaded position on said bolsters, a pair of motors mounted on said chassis and located intermediate said bolsters and disposed in laterally spaced-apart relation and respectively positioned adjacent to the opposite top sides of said chassis, said motors being located below the plane of the tops of said bolsters, so as to prevent interference with side loading and side unloading of said container with respect to said chassis, each one of said motors being of the piston-cylinder type and including an elongated piston rod mounted for reciprocating movements relative to and laterally of said chassis and along a line disposed substantially normal to the corresponding one adjacent side of said chassis, a pair of pawl elements respectively carried by said piston rods respectively adjacent to the outer ends thereof, each one of said piston rods having a stroke such that upon extension thereof the corresponding one of said pawl elements is positioned well outwardly from the corresponding adjacent outer ends of said bolsters and such that upon contraction thereof said one pawl element is positioned inwardly of the corresponding adjacent outer ends of said bolsters, means carried by said chassis for selectively operating said motors, each one of said motors being operative to effect reciprocation of the corresponding one of said piston rods, and an elongated laterally extending rack element fixed to the bottom of said base and adapted selectively to cooperate with said pawl elements, each one of said pawl elements being selectively adjustable between loading and unloading positions of cooperation with said rack element, wherein each one of said pawl elements in its loading position clutches said rack element in response to contraction of the corresponding one of said piston rods and overrides said rack element in response to expansion of said one piston rod, with the result that reciprocation of said one piston rod effects inward step-by-step sliding movement of said base over the corresponding adjacent outer ends of said bolsters and the consequent side loading of said container upon said bolsters, and wherein each one of said pawl elements in its unloading position clutches said rack element in response to expansion of the corresponding one of said piston rods and overrides said rack element in response to contraction of said one piston rod with the result that reciprocation of said one piston rod effects outward step-by-step sliding movement of said base over the corresponding adjacent outer ends of said bolsters and the consequent side unloading of said container from said bolsters, said piston rods being arranged in lateral alignment with each other, whereby said container may be slid in either lateral direction across said bolsters and between two external supports respectively positioned on opposite sides of said chassis by sequential operation of said motors.

9. In combination, a road vehicle including an elongated longitudinally extending chassis, a pair of laterally extending and longitudinally spaced-apart bolsters carried on the top of said chassis, a freight container having an elongated longitudinally extending and generally rectangular base, said bolsters accommodating side loading and side unloading of said container with respect to said chassis and laterally over either pair of corresponding ends of said bolsters, the tops of said bolsters being arranged in a generally horizontal plane and directly engaging the bottom of said base respectively adjacent to the opposite ends of said base and accommodating sliding movements in either lateral direction of said base over either pair of corresponding ends of said bolsters incident to side loading and to side unloading of said container with respect to said chassis, four individual locking mechanisms respectively carried by the four ends of said bolsters, each of said locking mechanisms being selectively operative between lock and unlock positions with respect to a corresponding adjacent one of the four corners of said base when said container occupies its loaded position on said bolsters, a pair of first motors mounted on said chassis and located adjacent to the rear end thereof and disposed in laterally spaced-apart relation and respectively positioned adjacent to the opposite sides of said chassis, each one of said first motors being of the piston-cylinder type and including an elongated first piston rod mounted for reciprocating movements relative to and vertically of said chassis, a pair of feet respectively carried by said first piston rods respectively adjacent to the outer ends thereof, each of said first piston rods having a stroke such that upon extension thereof the corresponding one of said feet is lowered to engage the ground and such that upon contraction thereof said one foot is elevated to disengage the ground, a pair of second motors mounted on said chassis and located intermediate said bolsters and disposed in laterally spaced-apart relation and respectively positioned adjacent to the opposite top sides of said chassis, said second motors being located below the plane of the tops of said bolsters, so as to prevent interference with side loading and side unloading of said container with respect to said chassis, each one of said second motors being of the piston-cylinder type and including an elongated second piston rod mounted for reciprocating movements relative to and laterally of said chassis and along a line disposed substantially normal to the corresponding one adjacent side of said chassis, a pair of pawl elements respectively carried by said second piston rods respectively adjacent to the outer ends thereof, each one of said second piston rods having a stroke such that upon extension thereof the corresponding one of said pawl elements is positioned well outwardly from the corresponding adjacent outer ends of said bolsters and such that upon contraction thereof said one pawl element is positioned inwardly of the corresponding adjacent outer ends of said bolsters, a control station carried by said chassis adjacent to the front end thereof and projecting well thereabove, first control means carried by said control station for selectively operating said first motors, each one of said first motors being selectively operative to project and to contract the corresponding one of said first piston rods, second control means carried by said control station for selectively operating said second motors, each one of said second motors being operative to effect reciprocation of the corresponding one of said second piston rods, and an elongated laterally extending rack element fixed to the bottom of said base and adapted selectively to cooperate with said pawl elements, each one of said pawl elements being selectively adjustable between loading and unloading positions of cooperation with said rack element, wherein each one of said pawl elements in its loading position clutches said rack element in response to contraction of the corresponding one of said second piston rods and overrides said rack element in response to expansion of said one second piston rod, with the result that reciprocation of said one second piston rod effects inward step-by-step sliding movement of said base over the corresponding adjacent outer ends of said bolsters and the consequent side loading of said container upon said bolsters, and wherein each one of said pawl elements in its unloading position clutches said rack element in response to expansion of the corresponding one of said second piston rods and overrides said rack element in response to contraction of said one second piston rod, with the result that reciprocation of said one second piston rod effects outward step-by-step sliding movement of said base over the corresponding adjacent outer ends of said bolsters and the consequent side unloading of said container from said bolsters, said second piston rods being arranged in lateral alignment with each other, whereby said container may be slid in either lateral direction across said bolsters and between two external supports respectively positioned on opposite sides of said chassis by sequential operation of said second motors.

10. In combination, a road vehicle including an elongated longitudinally extending chassis, a pair of laterally extending and longitudinally spaced-apart end bolsters respectively carried on the top end portions of said chassis, a first container having an elongated longitudinally extending and generally rectangular first base, said end bolsters accommodating side loading and side unloading of said first container with respect to said chassis and laterally over either pair of corresponding ends of said end bolsters, the tops of said end bolsters being arranged in a generally horizontal plane and directly engaging the bottom of said first base respectively adjacent to the opposite ends of said first base and accommodating sliding movements in either lateral direction of said first base over either pair of corresponding ends of said end bolsters incident to side loading and to side unloading of said first container with respect to said chassis, a middle bolster carried by the intermediate top portion of said chassis and located intermediate said end bolsters, said middle bolster being selectively operative between an erected position and a storage position, the top of said middle bolster in its erected position being disposed substantially in the horizontal plane of the tops of said end bolsters and in its storage position well below the horizontal plane of the tops of said end bolsters, said middle bolster in its erected position extending laterally of said chassis, a second container having an elongated longitudinally extending and generally rectangular second base, each one of said end bolsters and said middle bolster accommodating side loading and side unloading of said second container with respect to said chassis and laterally over either pair of corresponding ends of said one end bolster and said middle bolster, the top of either one of said end bolsters and said middle bolster directly engaging the bottom of said second base respectively adjacent to the opposite ends of said second base and accommodating sliding movements in either lateral direction of said second base over either pair of corresponding ends of said one end bolster and said middle bolster incident to side loading and to side unloading of said second container with respect to said chassis, whereby said second container may be mounted either upon the front end portion or upon the rear end portion of said chassis, a pair of front motors mounted on said chassis and located intermediate the front one of said end bolsters and said middle bolster and disposed in laterally spaced-apart relation and respectively positioned adjacent to the opposite top sides of said chassis, a pair of rear motors mounted on said chassis and located intermediate the rear one of said end bolsters and said middle bolster and disposed in laterally spaced-apart relation and respectively positioned adjacent to the opposite top sides of said chassis, said motors being located below the plane of the tops of said end bolsters, so as to prevent interference with side loading and side unloading of said containers with respect to said chassis, each one of said motors being of the piston-cylinder type and including an elongated piston rod mounted for reciprocating movements relative to and laterally of said chassis and along a line disposed substantially normal to the corresponding one adjacent side of said chassis, four individual pawl elements respectively carried by said piston rods respectively adjacent to the outer ends thereof, each one of said piston rods having a stroke such that upon extension thereof the corresponding one of said pawl elements is positioned well outwardly from the corresponding one adjacent side edge of said platform and such that upon contraction thereof said one pawl element is positioned closely adjacent to the one adjacent side edge of said platform, means carried by said chassis for selectively operating said motors, each one of said motors being operative to effect reciprocation of the corresponding one of said piston rods, a pair of laterally extending and longitudinally spaced-apart first rack elements fixed to the bottom of said first base and adapted respectively to cooperate with two of said pawl elements respectively carried by two of said piston rods disposed on either side of said chassis, so as to facilitate side loading and side unloading of said first container with respect to said chassis, and a laterally extending second rack element fixed to the bottom of said second base and adapted to cooperate with any one of said pawl elements carried by any corresponding one of said piston rods, so as to facilitate side loading and side unloading of said second container with respect to said chassis.

11. The combination set forth in claim 10, and further comprising a pair of front locking mechanisms respectively carried by said front end bolster respectively adjacent to the outer ends thereof and adapted respectively to cooperate with a pair of front corners of either of said containers, a pair of rear locking mechanisms respectively carried by said rear end bolster and adapted respectively to cooperate with a pair of rear corners of either of said containers, a pair of first middle locking mechanisms respectively carried by said middle bolster respectively adjacent to the outer ends thereof and adapted respectively to cooperate with a pair of rear corners of said second base when said second container is mounted upon the front end portion of said chassis, a pair of second middle bolster respectively adjacent to the outer ends thereof and adapted respectively to cooperate with a pair of front corners of said second base when said second container is mounted upon the rear end portion of said chassis.

12. The combination set forth in claim 10, wherein the longitudinal distance between said end bolsters is substantially 4L, the longitudinal distance between either of said end bolsters and said middle bolster is substantially 2L, the longitudinal distance between said front end bolster and said pair of front motors is substantially L, the longitudinal distance between said rear end bolster and said pair of rear motors is substantially L, the longitudinal distance between the opposite ends of said first base is substantially 4L, the longitudinal distance between either end of said first base and the adjacent one of said first rack elements is substantially L, the longitudinal distance between the opposite ends of said second base is substantially 2L, and the longitudinal distance between either end of said second base and said second rack element is substantially L; and wherein L is a fixed dimension.

13. The combination set forth in claim 12, wherein L has a dimension of about ten feet.

14. A road semi-trailer comprising an elongated longitudinally extending chassis, king-pin structure at the lower front end of said chassis for connection to an associate road tractor, road wheel structure at the lower rear end of said chassis for support upon an associated highway, an upstanding control station at the front end of said chassis and accessible to an operator standing upon the rear end of a connected road tractor, a laterally extending front end bolster carried by the top of said chassis adjacent to the front end thereof, a laterally extending rear end bolster carried by the top of said chassis adjacent to the rear end thereof, the tops of said end bolsters being disposed in a generally horizontal plane, a middle bolster carried by said chassis adjacent to the intermediate portion thereof and located longitudinally between said end bolsters, means for mounting said middle bolster upon said chassis for movements between an erected position and a storage position, said middle bolster in its erected position extending laterally of said chassis and the top thereof being located substantially in the plane of the tops of said end bolsters, said middle bolster in its storage position extending longitudinally of said chassis and the top thereof being located substantially below the plane of the tops of said end bolsters, said end bolsters with said middle bolster in its storage position being adapted to support the opposite ends of a long container mounted thereupon, thereby to accommodate side loading and side unloading of a single long container with respect to said chassis, either of said end bolsters and said middle bolster in its erected position being adapted to support the opposite ends of a short container mounted thereupon, thereby to accommodate side loading and side unloading of two short containers with respect to said chassis, wherein the long container mentioned has a length that is approximately equal to twice that of the short container mentioned, a pair of front motors mounted upon said chassis intermediate said front end bolster and said middle bolster and located below the plane of the tops of said end bolsters and respectively disposed on opposite sides of said chassis, a pair of rear motors mounted upon said chassis intermediate said rear end bolster and said middle bolster and located below the plane of the tops of said end bolsters and respectively disposed on opposite sides of said chassis, each of said motors being of the piston-cylinder type including an elongated piston rod mounted for reciprocation along a line disposed substantially normal to the adjacent side of said chassis, each one of said piston rods having a stroke such that upon expansion thereof the outer end of said one piston rod is disposed well outwardly laterally with respect to the adjacent side of said chassis and such that upon contraction thereof the outer end of said one piston rod is disposed closely adjacent to the adjacent side of said chassis, whereby said motors facilitate side loading and side unloading of containers with respect to said chassis, and four control devices carried by said control station and respectively corresponding to said four motors named, each one of said control devices being selectively controllable to effect expansion and to effect contraction as desired of the corresponding one of said piston rods.

15. The road semi-trailer set forth in claim 14, and further comprising a pair of front locking devices carried by said front end bolster respectively adjacent to the opposite ends thereof and adapted respectively to cooperate with the two front corners of the base of either a long container or a short container mounted upon said front end bolster, a pair of rear locking devices carried by said rear end bolster respectively adjacent to the opposite ends thereof and adapted respectively to cooperate with the two rear corners of the base of either a long container or a short container mounted upon said rear end bolster, a first pair of middle locking devices carried by said middle bolster respectively adjacent to the opposite ends thereof and adapted respectively to cooperate with the two rear corners of the base of a short container mounted upon said middle bolster, and a second pair of middle locking devices carried by said middle bolster respectively adjacent to the opposite ends thereof and adapted respectively to cooperate with the two front corners of the base of a short container mounted upon said middle bolster.

16. The road semi-trailer set forth in claim 15; wherein each one of said locking devices named comprises a bolt pivotally mounted at the inner end thereof in the adjacent outer end of the associated one of said bolsters for movements between a lock position and a release position, said bolt in its lock position being disposed in an upstanding attitude with respect to the adjacent outer end of said one bolster and in locking relation with respect to the adjacent corner of the base of a container in its mounted position upon said one bolster, said bolt in its release position being disposed in a depending attitude with respect to the adjacent outer end of said one bolster and in releasing relation with respect to the adjacent corner of the base of a container in its mounted position upon said one bolster, and manually operable means for selectively restraining said bolt in its lock position.

17. The road semi-trailer set forth in claim 15; wherein each one of said locking devices named comprises a bolt pivotally mounted at the inner end thereof in the adjacent outer end of the associated one of said bolsters for movements between a lock position and a release position, said bolt in its lock position being disposed in an upstanding attitude with respect to the adjacent outer end of said one bolster and in locking relation with respect to the adjacent corner of the base of a container in its mounted position upon said one bolster, said bolt in its release position being disposed in a depending attitude with respect to the adjacent outer end of said one bolster and in releasing relation with respect to the adjacent corner of the base of a container in its mounted position upon said one bolster, latching mechanism having a set position restraining said bolt in its lock position, and manually operable means for selectively tripping said latching mechanism, said bolt being biased into its release position so that the same is moved from its lock position into its release position in response to tripping of said latching mechanism.

18. In combination, a bolster adapted to accommodate the carrying upon a vehicle of a removable container, said bolster comprising an elongated block-like body provided with a top surface adapted directly to support the adjacent end of a container mounted thereupon, and a pair of locking devices respectively carried by the opposite ends of said bolster and adapted respectively to cooperate with the opposite corners of the base of a container in its mounted position upon said bolster; each of said locking devices comprising a bolt pivotally mounted at the inner end thereof in the adjacent outer end of said bolster for movements between a lock position and a release position and a storage position, said bolt in its lock position being disposed in an upstanding attitude with respect to the adjacent outer end of said bolster and in locking relation with respect to the adjacent corner of the base of a container in its mounted position upon said bolster, said bolt in its release position being disposed in a depending attitude with respect to the adjacent outer end of said bolster and in unlocking relation with respect to the adjacent corner of the base of a container in its mounted position upon said bolster, said bolt in its storage position being disposed in an under-swung attitude with respect to the adjacent outer end of said bolster and entirely below said bolster, wherein said lock position is at an elevation above that of said storage position and said storage position is at an elevation above that of said release position, first locking mechanism cooperating with said bolt in its lock position, said first locking mechanism being set in response to movement of said bolt into its lock position, second locking mechanism cooperating with said bolt in its storage position, said second locking mechanism being set in response to movement of said bolt into its storage position, and means including a manually operable member carried by said bolster adjacent to said locking mechanisms and operatively associated therewith for selectively tripping said locking mechanisms, said bolt being pivoted by gravity from its lock position through its release position into its storage position in response to tripping of said first locking mechanism, said bolt being pivoted by gravity from its storage position into its release position in response to tripping of said second locking mechanism.

19. In combination, a bolster adapted to accommodate the carrying upon a vehicle of a removable container, said bolster comprising an elongated block-like body provided with a top surface adapted directly to support the adjacent end of a container mounted thereupon, and a pair of locking devices respectively carried by the opposite ends of said bolster and adapted respectively to cooperate with the opposite corners of the base of a container in its mounted position upon said bolster; each of said locking devices comprising a bolt pivotally mounted at the inner end thereof in the adjacent outer end of said bolster for movements between a lock position and a release position and a storage position, said bolt in its lock position being disposed in an uptsanding attitude with respect to the adjacent outer end of said bolster and in locking relation with respect to the adjacent corner of the base of a container in its mounted position upon said bolster, said bolt in its release position being disposed in a depending attitude with respect to the adjacent outer end of said bolster and in unlocking relation with respect to the adjacent corner of the base of a container in its mounted position upon said bolster, said bolt in its storage position being disposed in an under-swung attitude with respect to the adjacent outer end of said bolster and entirely below said bolster, wherein said lock position is at an elevation above that of said storage position and said storage position is at an elevation above that of said release position, first locking mechanism cooperating with said bolt in its lock position, said first locking mechanism being set in response to movement of said bolt into its lock position, second locking mechanism cooperating with said bolt in its storage position, said second mechanism being set in response to movement of said bolt into its storage position, a manually operable member carried by said bolster adjacent to said locking mechanism and operatively associated therewith, said member being movable between a normal position and an operated position, and means responsive to movement of said member into its operated position for tripping either set one of said locking mechanisms.

20. The combination set forth in claim 19, wherein said member is in the form of a handle, and further comprising means biasing said handle into its normal position.

References Cited by the Examiner

UNITED STATES PATENTS

| | | | |
|---|---|---|---|
| 1,877,193 | 9/1932 | Norton | 214—516 X |
| 2,348,019 | 5/1944 | Norbom | 214—516 |
| 3,144,149 | 8/1964 | Dempster | 214—516 X |

HUGO O. SCHULZ, *Primary Examiner.*

UNITED STATES PATENT OFFICE
CERTIFICATE OF CORRECTION

Patent No. 3,219,218                      November 23, 1965

Albert M. Hand

It is hereby certified that error appears in the above numbered patent requiring correction and that the said Letters Patent should read as corrected below.

Column 17, line 17, after "middle" insert -- locking mechanisms respectively carried by said middle --.

Signed and sealed this 20th day of September 1966.

(SEAL)
Attest:

ERNEST W. SWIDER                            EDWARD J. BRENNER
Attesting Officer                                 Commissioner of Patents